United States Patent
Bitto et al.

(10) Patent No.: US 8,099,850 B2
(45) Date of Patent: Jan. 24, 2012

(54) METHOD FOR MANUFACTURING A MEASURING TRANSDUCER OF VIBRATION-TYPE

(75) Inventors: Ennio Bitto, Aesch (CH); Rainer Lorenz, Lorrach (DE); Holger Bernhard, Grenzach-Wyhlen (DE)

(73) Assignee: Endress + Hauser Flowtec AG, Reinach (CH)

( * ) Notice: Subject to any disclaimer, the term of this patent is extended or adjusted under 35 U.S.C. 154(b) by 3 days.

(21) Appl. No.: 12/457,025

(22) Filed: May 29, 2009

(65) Prior Publication Data

US 2009/0235759 A1 Sep. 24, 2009

Related U.S. Application Data

(62) Division of application No. 11/723,762, filed on Mar. 22, 2007, now Pat. No. 7,546,777.

(60) Provisional application No. 60/785,383, filed on Mar. 24, 2006.

(30) Foreign Application Priority Data

Mar. 22, 2006 (DE) .......................... 10 2006 013 601

(51) Int. Cl.
*B21D 39/00* (2006.01)
*G01F 1/76* (2006.01)
(52) U.S. Cl. ..................................... 29/452; 73/861.355
(58) Field of Classification Search .................... 29/452, 29/525.11; 73/861.355, 861.356, 861.357
See application file for complete search history.

(56) References Cited

U.S. PATENT DOCUMENTS

| | | | |
|---|---|---|---|
| 3,745,633 A | 7/1973 | Langewis |
| 4,090,382 A | 5/1978 | Schott |
| 4,127,028 A | 11/1978 | Cox |
| 4,524,610 A | 6/1985 | Fitzgerald |
| 4,586,731 A | 5/1986 | Castrup |

(Continued)

FOREIGN PATENT DOCUMENTS

DE 40 26 724 A1 3/1992
(Continued)

*Primary Examiner* — Jermie Cozart
(74) *Attorney, Agent, or Firm* — Bacon & Thomas, PLLC

(57) ABSTRACT

The measuring transducer includes at least one measuring tube communicating with a line connected during operation for conveying a medium to be measured, and a support element oscillatably holding the at least one measuring tube. Additionally, it is provided that the support element contains at least two passageways, via which the at least one measuring tube communicates with the line, and that the at least one measuring tube is affixed, especially releasably, at least one end to the support element by means of a screwed-fitting at one of the passageways. Alternatively or in supplementation thereof, it is further provided that the at least one measuring tube is, at least in part, made of cold-strengthened, for instance cold-stretched or autofrettaged, material. As required, the measuring transducer can further include at least two measuring tubes communicating with the line for conveying the medium; each of these two measuring tubes is to be connected to an inlet-side distributor element and an outlet-side distributor element. In such case, at least one of the two distributor elements can be embodied as an integral component of the support element, so that the support element can be kept, at least in the area of this at least one distributor element, free of materially bonded, joined locations, especially free of solder, braze or weld connections. The measuring transducer of the invention is especially provided also for applications in which the medium to be measured acts with a pressure of more than 500 bar, especially over 700 bar, on the measuring tube.

10 Claims, 7 Drawing Sheets

U.S. PATENT DOCUMENTS

| | | | | |
|---|---|---|---|---|
| 4,768,384 | A | 9/1988 | Flecken | |
| 4,793,191 | A | 12/1988 | Flecken | |
| 4,823,614 | A | 4/1989 | Dahlin | |
| 5,177,990 | A * | 1/1993 | Isgen | 72/54 |
| 5,253,533 | A | 10/1993 | Lam | |
| 5,301,557 | A | 4/1994 | Cage | |
| 5,549,009 | A | 8/1996 | Zaschel | |
| 5,610,342 | A | 3/1997 | Wenger | |
| 5,796,011 | A | 8/1998 | Keita | |
| 6,006,609 | A | 12/1999 | Drahm | |
| 6,047,457 | A | 4/2000 | Bitto | |
| 6,168,069 | B1 | 1/2001 | Lorenz | |
| 6,273,142 | B1 | 8/2001 | Braad | |
| 6,314,820 | B1 | 11/2001 | Ollila | |
| 6,352,196 | B1 | 3/2002 | Lorenz | |
| 6,397,685 | B1 | 6/2002 | Cook | |
| 6,450,042 | B1 | 9/2002 | Lanham | |
| 6,487,917 | B1 | 12/2002 | Van Cleve | |
| 6,502,323 | B2 | 1/2003 | Williams | |
| 6,513,393 | B1 | 2/2003 | Eckert | |
| 6,516,674 | B1 | 2/2003 | Poremba | |
| 6,519,828 | B1 | 2/2003 | Cook | |
| 6,523,421 | B1 | 2/2003 | Tanner | |
| 6,598,281 | B2 | 7/2003 | Cook | |
| 6,634,241 | B1 | 10/2003 | Van Cleve | |
| 6,640,457 | B2 | 11/2003 | Williams | |
| 6,666,098 | B2 | 12/2003 | Drahm | |
| 6,698,644 | B2 | 3/2004 | Lorenz | |
| 6,711,958 | B2 | 3/2004 | Bitto | |
| 6,766,582 | B2 | 7/2004 | Williams | |
| 6,769,163 | B2 | 8/2004 | Van Cleve | |
| 6,776,053 | B2 | 8/2004 | Schlosser | |
| 6,807,866 | B2 | 10/2004 | Drahm | |
| 6,851,323 | B2 | 2/2005 | Rieder | |
| 7,005,019 | B2 | 2/2006 | Pawlas | |
| 7,036,346 | B2 | 5/2006 | Burger | |
| 7,127,815 | B2 * | 10/2006 | Schlosser et al. | 29/890.09 |
| 2005/0160787 | A1 | 7/2005 | Bitto | |

FOREIGN PATENT DOCUMENTS

| | | |
|---|---|---|
| DE | 297 09 692 U1 | 9/1997 |
| DE | 103 54 373 A1 | 6/2005 |
| EP | 1 182 433 A2 | 2/2002 |
| EP | 1 207 375 A1 | 5/2002 |
| EP | 1 296 128 A1 | 3/2003 |
| GB | 1 473 984 | 5/1977 |
| WO | WO 00/36379 | 6/2000 |
| WO | WO 02/099363 A1 | 12/2002 |
| WO | WO 03/048693 A1 | 6/2003 |
| WO | WO 2005/050144 A1 | 6/2005 |

* cited by examiner

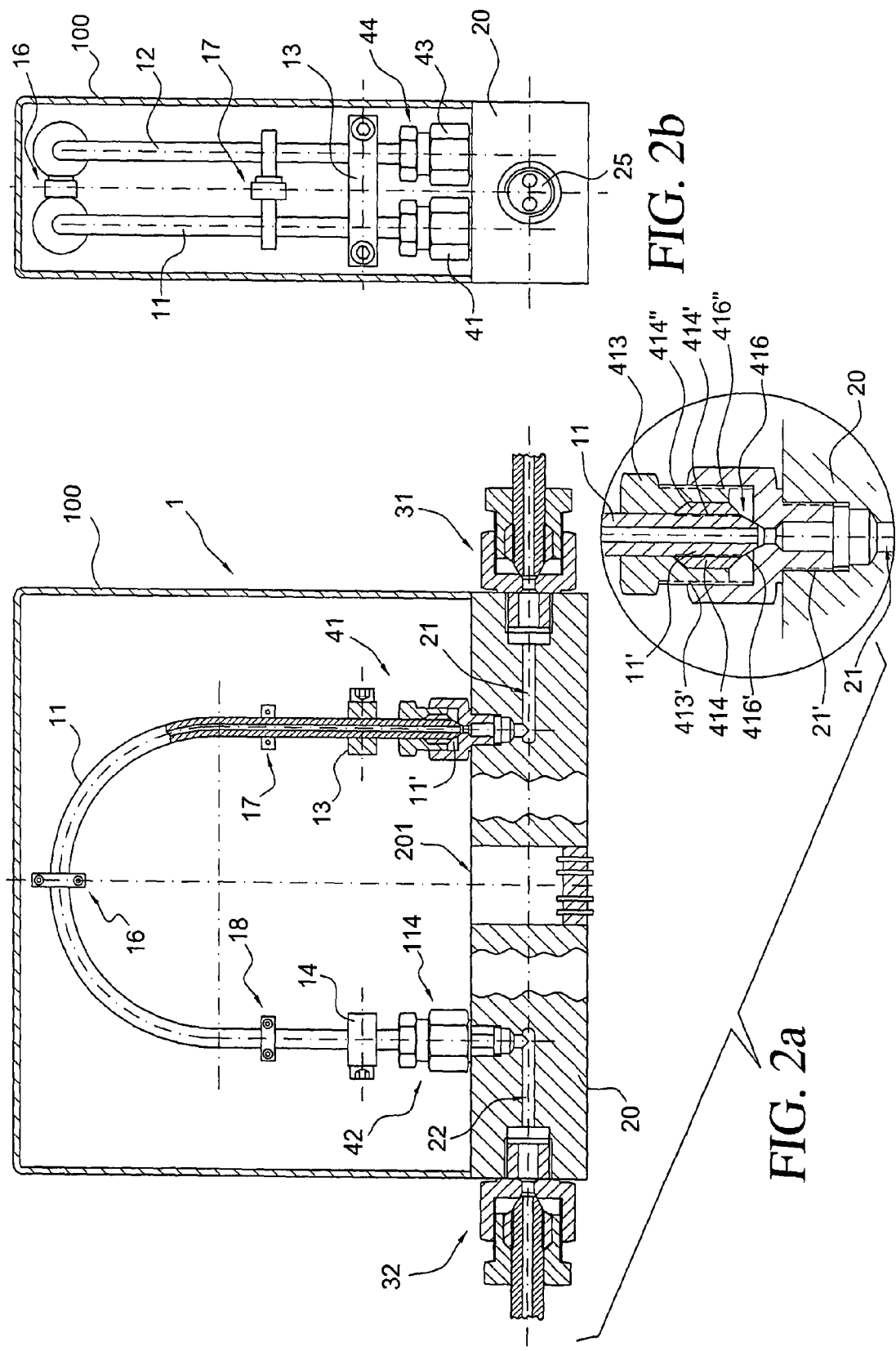

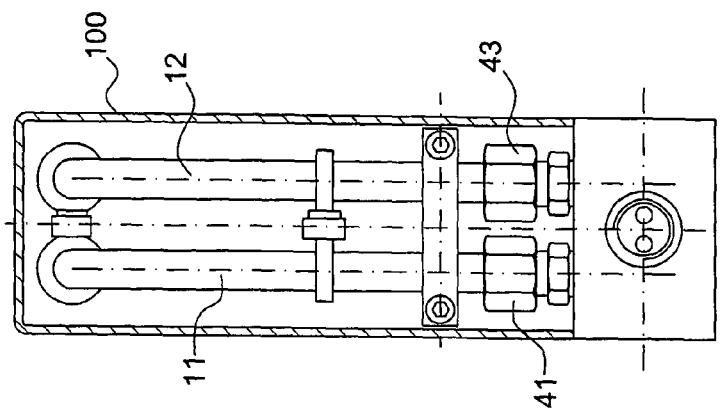
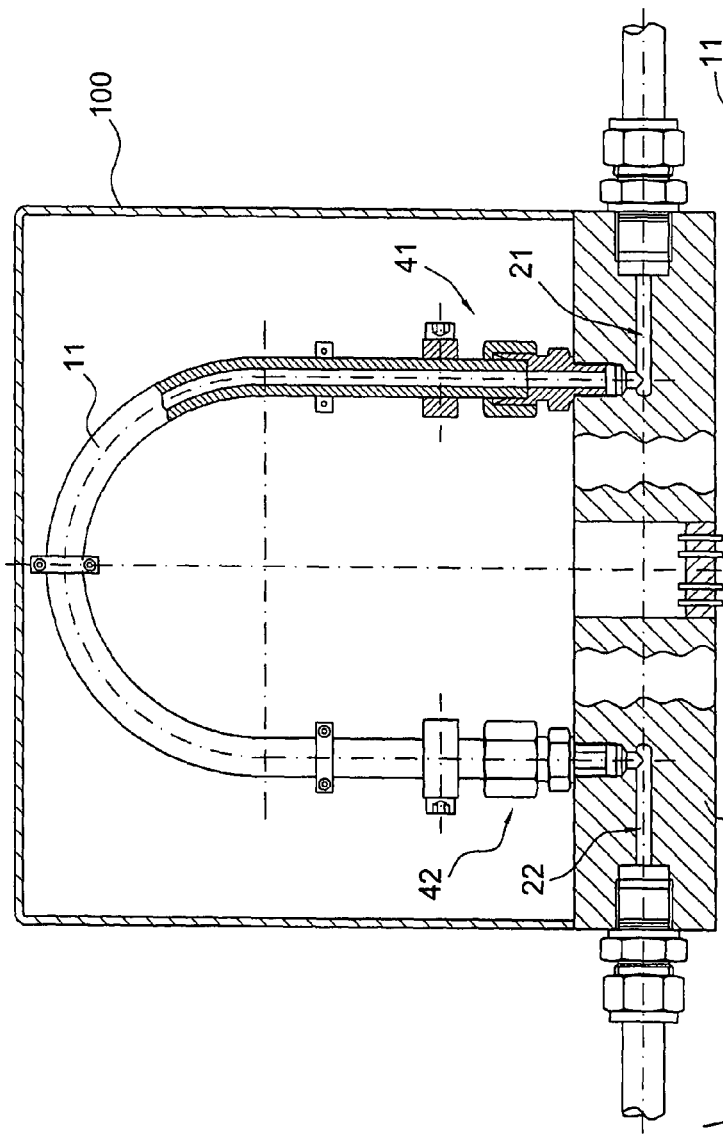
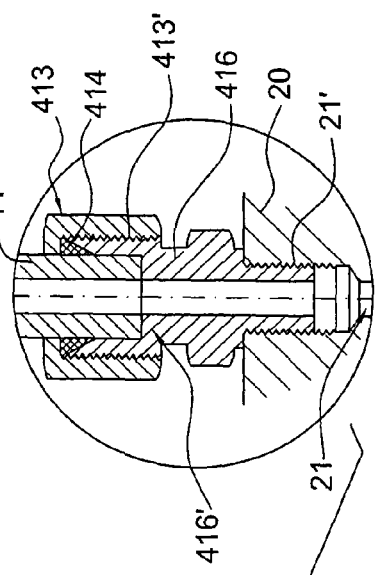
FIG. 3b
FIG. 3a

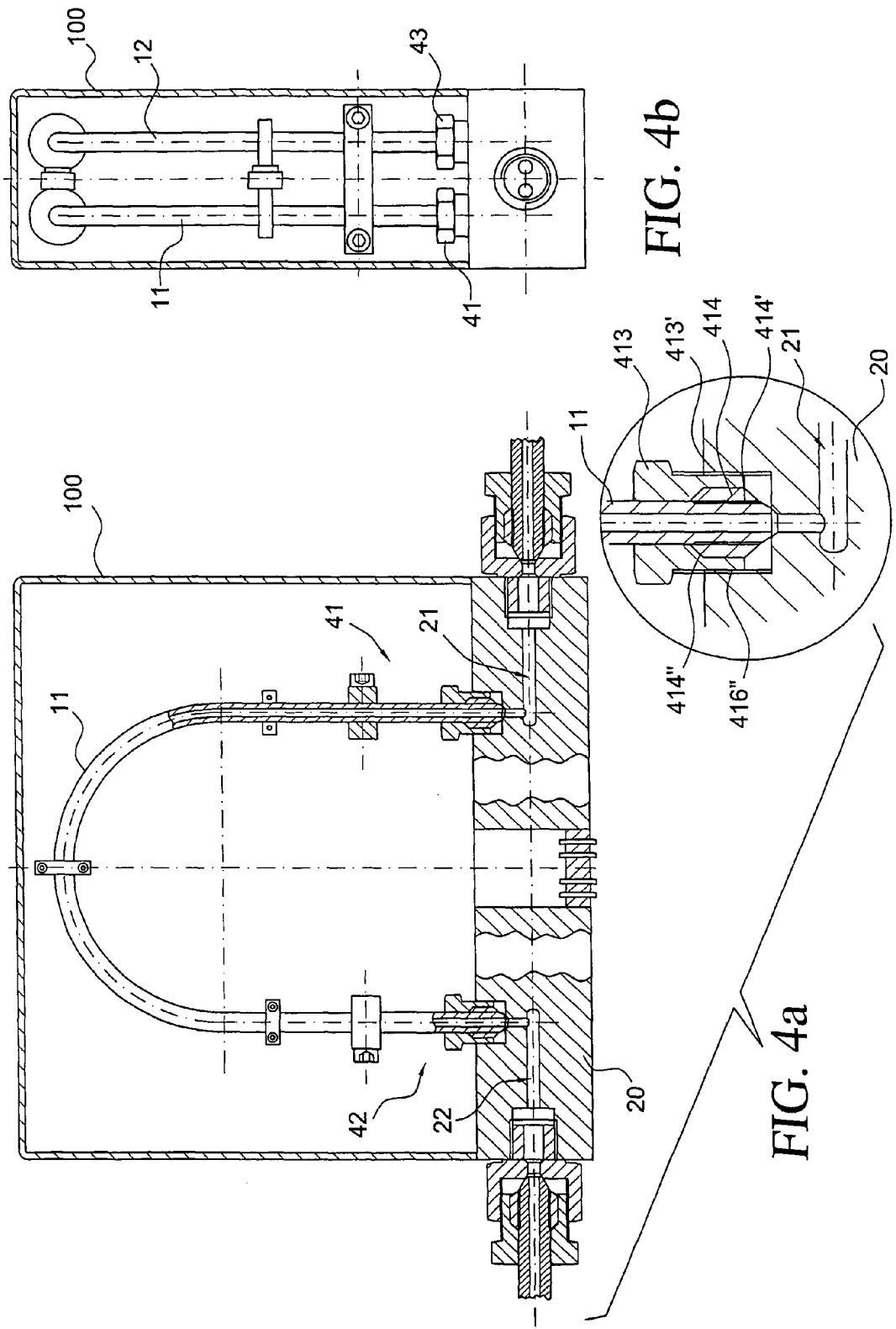

METHOD FOR MANUFACTURING A MEASURING TRANSDUCER OF VIBRATION-TYPE

CROSS-REFERENCES TO RELATED APPLICATIONS

This application is a divisional of U.S. patent application Ser. No. 11/723,762 which was filed on Mar. 22, 2007; which is a nonprovisional application based on U.S. Provisional application 60/785,383, which was filed on Mar. 24, 2006; and priority is also claimed from German application 102006013601.2 filed on Mar. 22, 2006. It also contains subject matter which is related to the subject matter disclosed in U.S. patent application Ser. No. 11/723,763 filed on Mar. 22, 2007 and U.S. patent application Ser. No. 11/723,764 filed on Mar. 22, 2007.

FIELD OF THE INVENTION

The invention relates to a measuring transducer of vibration-type, for example one embodied in the form of a Coriolis mass-flow measuring transducer, for an inline measuring device serving for measurement of a medium flowing in a line, for instance a pipeline or a tubular line.

BACKGROUND OF THE INVENTION

In the technology of industrial measurements and automation, often used for the highly accurate measurement of process measured variables of media flowing in lines, especially pipelines, are inline measuring devices utilizing measuring transducers of vibration type. Such transducers have at least one measuring tube communicating with the pipeline conveying the medium and vibrating during operation. The construction, functioning and applications of such measuring transducers of vibration-type are described in detail in, among other places, U.S. Pat. Nos. 4,127,028, 4,524,610, 4,768,384, 4,793,191, 4,823,614, 5,253,533, 5,301,557, 5,610,342, 6,006,609, 6,047 457, 6,168,069, 6,314,820, 6,352,196, 6,397,685, 6,450,042, 6,487,917, 6,516,674, 6,519,828, 6,523,421, 6,598,281, 6,666,098, 6,698,644, 6,711,958, 6,769,163, 6,776,053, 6,807,866, 7,005,019, US-A 2005/0160787, WO-A 03/048693, or WO-A 05/050144.

Measuring transducers of vibration-type serve, as is known, in conjunction with a measuring device electronics connected therewith, for producing in the medium instantaneously conveyed in the at least one measuring tube, reaction forces appropriately corresponding with the process measured variable to be measured, for instance Coriolis forces corresponding with a mass flow, inertial forces corresponding with a density, or frictional forces corresponding with a viscosity, and for producing, derived from these forces, a measurement signal appropriately corresponding with the process measured variable, for example the particular mass flow, viscosity and/or density. The at least one measuring tube of the measuring transducer is, for such purpose, usually installed in a manner tight to the medium, especially pressure tightly, and most often, also permanently, into the course of the pipeline conveying the medium, for example, by means of appropriate flange connections. For the oscillatable holding of the at least one measuring tube, there is additionally provided a tubular, or frame-shaped, support element, for example one of steel, which is, in comparison to the measuring tube, most often very bending-stiff. The support element is mechanically coupled to the measuring tube, or tubes, for example directly affixed thereto, on the inlet and outlet sides. The support element can, as is usual in the case of measuring transducers of such type and also directly perceivable from the above-cited state of the art, supplement the already mentioned transducer housing as appropriately externally applied covers, for instance by means of tubularly covering caps or laterally attached sheet or plate, or the support element can itself be built as the transducer housing.

For driving the at least one measuring tube, measuring transducers of the described kind additionally include an exciter mechanism electrically connected with the measuring device electronics and having an oscillation exciter, especially an electrodynamic or electromagnetic oscillation exciter, mechanically interacting with the measuring tube. During operation, the exciter mechanism is so activated in suitable manner by the measuring device electronics by means of corresponding exciter signals, that the measuring tube executes, at least temporarily, vibrations, especially bending oscillations and/or torsional oscillations. Furthermore, a sensor arrangement is provided for producing oscillation measurement signals. The sensor arrangement has, at least in the case of use of the measuring transducer as a Coriolis mass-flow measuring transducer, at least two mutually spaced sensor elements reacting to inlet-side, respectively outlet-side, vibrations of the measuring tube.

Besides the possibility of simultaneous measurement of a plurality of such process variables of flowing media, especially mass flow, density, and/or viscosity, by means of one and the same measuring device, an additional, significant advantage of inline measuring devices with measuring transducers of vibration type is, among other things, that they have, within predetermined operating limits, a very high accuracy of measurement, coupled with relatively small sensitivity to disturbances. Beyond this, such a measuring device can be used for practically any flowable medium and can be installed in a variety of different areas of application in the technology of measurements and automation.

In the case of inline measuring devices of the described kind, which are used as Coriolis mass-flow meters, the measuring device electronics included as a part thereof measures, during operation, among other things, a phase difference between the two oscillation measurement signals delivered by the sensor elements and issues at its output a measured value signal derived therefrom. This measured value signal represents, as a function of time, a measured value corresponding to the mass-flow. If, as usual in the case of such inline measuring devices, also the density of the medium is to be measured, then the measuring device electronics measures therefor, on the basis of the oscillation measurement signals, additionally, an instantaneous oscillation frequency of the measuring tubes. Moreover, also, for example, the viscosity of the medium can be ascertained on the basis of the power, especially a corresponding exciter current for the exciter mechanism, needed for maintaining the measuring tube oscillations.

For operating the measuring transducer, especially also for the further processing or evaluation of the at least one measurement signal, such is, as already indicated, electrically connected with a corresponding measuring device electronics. In the technology of industrial measurements and automation, this measuring device electronics is additionally often connected via an attached data transmission system, with other measuring devices and/or with a remote central-computer, to which it sends, e.g. via a digital data bus, the measured value signals. Serving, in such case, as data transmission systems are often bus systems, especially serial bus systems, such as e.g. PROFIBUS-PA, FOUNDATION FIELDBUS, as well as the corresponding transmission protocols. By means of the central computer, the transmitted measured value signals can be further processed and visualized as corresponding measurement results e.g. on monitors and/or converted into control signals for corresponding control elements, such as e.g. solenoid-operated valves, electric motors of pumps, etc. For accommodating the measuring device electronics, such inline measuring devices further include an electronics housing, which can, as proposed e.g. in WO-A 00/36379, be located remotely from the measuring transducer and connected therewith only via a flexible line, or which, as shown e.g. also in EP-A 1 296 128 or WO 02/099363, is arranged directly on the measuring transducer, especially on a measuring transducer housing, housing the measuring transducer.

In the case of measuring transducers of the described kind, essentially two types of tube shapes have established themselves in the market, namely, on the one hand, essentially straight measuring tubes, and, on the other hand, measuring tubes essentially curving in a tube plane, among these being tubes of essentially S-, U- or V-shape, such as are most often used. Especially in the case of Coriolis mass-flow measuring transducers serving for measuring mass flows, in the case of both types of tube shapes, for reasons of symmetry, most often two measuring tubes are used. These two measuring tubes extend, at rest, essentially parallel to one another and are, most often, also flowed-through in parallel by the medium. In this connection, reference can be made, by way of example, to U.S. Pat. Nos. 4,127,028, 4,768,384, 4,793,191, 5,301,557, 5,610,342, 5,796,011, or 6,450,042.

Besides measuring transducers with such a double measuring tube arrangement, there are, however, also measuring transducers, available for a long time in the market, that are characterized by a single, straight or curved, measuring tube. Such measuring transducers of vibration-type having a single measuring tube are described e.g. in U.S. Pat. Nos. 4,524,610, 4,823,614, 5,253,533, 6,006,609, 6,047,457, 6,168,069, 6,314,820, 6,397,685, 6,487,917, 6,516,674, 6,666,098, 6,698,644, 6,711,958, 6,807,866, WO-A 03/048693, or WO-A 05/050,144. Each of the measuring transducers disclosed therein includes, among other things, a measuring tube having an inlet end and an outlet end, vibrating at least at times, and built, for example, of steel, titanium, tantalum or zirconium, or suitable alloys with one or more of these metals, for conveying the medium to be measured.

For the aforementioned case, in which the measuring transducer is one with a single measuring tube, there is provided in the measuring transducer, additionally, a counteroscillator, which is affixed to the measuring tube, especially a counteroscillator which is mounted oscillatably in the measuring transducer housing. Besides functioning for support of the oscillation exciter and sensor elements, the counteroscillator serves for decoupling, as regards oscillations, the vibrating measuring tube from the connected pipeline. The counteroscillator, which is most often made of cost-favorable steel and serves practically also as an internal support element, can, in such case, be embodied e.g. as a tubular compensation cylinder or box-shaped support frame arranged coaxially with the measuring tube.

The measuring transducers of vibration-type used in industrial measurements and automation technology face very high demands as regards their accuracy of measurement, which lies usually in the range of about 0.1% of the measured value and/or 0.01% of full scale. To achieve this, especially, a very high stability of the zero point is required, as well as also a very high robustness of the delivered measurement signals, especially also in the face of environmental, seating and/or operating conditions, which can change significantly during operation. As already discussed in detail in the mentioned U.S. Pat. Nos. 5,610,342, 6,047,457, 6,168,069, 6,519,828, 6,598,281, 6,698,644, 6,769,163, WO-A 03/048693, or WO-A 05/050144, for such, especially important is the mechanical strength, especially the fatigue strength, of the connection of the at least one measuring tube to the at least one support element. Apart from the fact that the operational safety of the entire measuring device can depend thereon, already the smallest deviation of the strength of this connection from that which existed at the time of the calibration can lead also to significant, no longer manageable fluctuations of the zero point and, consequently to essentially unusable measurement signals. Usually, such zero-point errors attributable to loss of strength in the measuring transducer can only be satisfactorily overcome by installation of a new inline measuring device.

As already discussed in detail in U.S. Pat. Nos. 5,610,342, 6,047,457, 6,168,069, 6,598,281, 6,634,241, or WO-A 03/048693, especially the joining technology applied for the securement of the measuring tube within the outer support element and to the possibly also present counteroscillator has a considerable influence on the accuracy of measurement in general and on the stability of the zero-point. Traditionally, the measuring tubes and support element are at least partially affixed to one another on the basis of material bonds brought about by soldering, brazing and/or welding. Thus, for example, already in U.S. Pat. No. 4,823,614, it is described, that the respective end of the one measuring tube is inserted into a respective bore of an inlet-side, respectively outlet side, endpiece of the support element and affixed therein by frontside or rearside welding, soldering or brazing; compare the material beads to be seen in some of the figures. The endpieces are, in turn, affixed in a jacketing tube of the outer support element. Further examples of such materially bonded connections of measuring tube and support element are shown, in among others, also U.S. Pat. Nos. 6,168,069, 6,352, 196, 6,519,828, 6,523,421, 6,598,281, 6,698,644, or 6,769, 163.

As described in U.S. Pat. No. 5,610,342, if the heat supplied to the affixing locations of the measuring tubes with the endpieces during the mentioned welding, soldering or brazing leaves behind, following cooling, a state of mechanical, residual stress, such can lead to stress corrosion cracking, which then more or less weakens the joints and/or the measuring tube material in this way also. A further problem of such materially bonded, weld, solder or braze connections is mentioned in U.S. Pat. Nos. 6,519,828 or 6,598,281, this being material-wearing, oscillatory rubbing in the areas of the joints. Moreover, as perceivable from U.S. Pat. Nos. 6,047, 457, 6,168,069, 6,352,196, 6,598,281, 6,634,241, 6,523,421, or 6,698,644, problems can arise relative to the permanence of soldered connections, problems which can be traced back to, among other things, insufficient wetting and/or radially alternating, mechanical stressing of the joints. As a result, often a decrease in the nominal pull-out strength of the measuring tube out of the support element is present. Additionally, in the case of heat-treated measuring tubes, changes extending into the depth of the material itself are present, be it with respect to the microstructure or the chemical composition. Accompanying this are significant changes of the material parameters, such as e.g. modulus of elasticity, ultimate tensile strength, ductility, etc., relevant for the oscillatory characteristics, as well as also for the component strength of the measuring transducer. This can especially degrade the opportunities for use of measuring transducers of the described kind in areas of application experiencing extremely high or low temperatures of the medium and/or significant temperature fluctuations, as well as also in areas of application experiencing extremely high media pressures of far above 500 bar.

For improving the long-term strength of measuring transducers of the described kind, the already mentioned U.S. Pat. No. 5,610,342, as well as also WO-A 03/048693, propose a securement method for measuring tubes in endpieces of the support element, wherein each end of the measuring tube is inserted into a corresponding bore of an inlet-side, respectively outlet-side, endpiece and pressed against the inner wall of the bore, especially without the application of heat, by means of a roller tool placed in the end, whereby a high-strength, frictionally interlocking connection is formed between the two components. A roller tool suitable for this method is described, for example, also in U.S. Pat. No. 4,090,382 in the context of a method for manufacturing boilers and heat exchangers.

A further possibility for manufacture of such connections between measuring tube and support element formed by means high-strength, frictionally interlocking is, as e.g. also proposed in U.S. Pat. No. 6,047,457, to externally compress the endpiece, following its insertion, or pushing, onto the measuring tube, by means of a pressing tool, and, at the same, to deform in a mixed plastic-elastic mode, beneath a recrystallization temperature of the material of the endpiece, especially at room temperature. The deformation forces used therefor are, in such case, and in each case, so developed, that the measuring tube experiences essentially no cross-sectional tapering and/or narrowing, so that an initial inner diameter of the measuring tube remains, following the securement, essentially unchanged all the way through. An apparatus correspondingly suited for the pressing is shown, for example, in U.S. Pat. No. 3,745,633. Alternatively or in supplementation of the plastic-elastic pressing, such a frictional interlocking can also be produced, as shown e.g. in U.S. Pat. Nos. 6,598,281 or 6,519,828, by thermally shrinking a corresponding metal body, be it the aforementioned endpiece or a metal sleeve placed on the measuring tube, etc., or, as also shown in WO-A 05/050144, by clamping the endpiece with the measuring tube using an interposed, elastically deformable clamping element.

Going further, it is discussed in U.S. Pat. Nos. 6,598,281 or 6,519,828, that also in the case of purely frictionally interlocking, press connections, due to oscillatory rubbing, it is not always possible to prevent, with certainty, a possible strength loss of the joined system. Moreover, such oscillatory rubbing can cause corrosion of the materials of the joined system in the region of the mutually contacting surfaces. Additionally, as perceivable from WO-A 03/048693, the usually different expansion behavior of the mentioned endpieces and the tube segments of the measuring tube in each case held therein, can lead, in the case of temperature fluctuations, especially in the case of possible temperature shocks, such as can arise e.g. in the case of regularly performed cleaning procedures with extremely hot washing liquids, to a sinking of the clamping forces exerted by the endpiece on the measuring tube below a critical value. This can mean, in turn, that the endpiece and the measuring tube, due to thermally caused expansions, lose, at locations, the mechanical contact brought about by the rolling, pressing or shrinking and so the press connection can be degraded to an unpermissible extent. As a result of this, in turn, the pull-out strength of the measuring tube out of the respective endpiece can sink and, therewith, also the required high zero-point stability of the measuring transducer achieved with press-joined assemblies can no longer be absolutely assured. For removing these deficiencies in measuring transducers of the described kind caused by oscillatory rubbing between measuring tube and respective endpieces, it is proposed in U.S. Pat. No. 6,598,281, respectively U.S. Pat. No. 6,519,828, also to weld the pertinent components together, following manufacture of the pressed assembly, especially in the case of use of a filling material serving as an intermediate layer, a practice which, however, possibly can raise anew the aforementioned problems associated with welded connections. In contrast, it is proposed in WO-A 03/048693 to achieve an increased anti-twist strength of the measuring tube and endpiece combination by forming a groove in the inner wall of the endpiece extending in the direction of the longitudinal axis of the joined system, in order to bring about a shape-interlocking effective in a circumferential direction for effectively preventing twisting of the measuring tube relative to the endpiece. However, even this connection can, especially in the case of use in a measuring transducer with a measuring tube executing, at least at times, bending oscillations, experience a lessening of the nominal pull-out strength, be it from oscillatory rubbing and/or from thermally related expansion.

Besides stability of the zero-point, also the sensitivity of the measuring transducer has a considerable influence on the accuracy with which a process measured variable is measured. In spite of the fact that measuring device electronics of inline measuring devices of the described kind are becoming ever more powerful and, as a result, always more precise, it is nevertheless to be acknowledged in this connection that, as regards accuracy of measurement, still an immense importance lies with the mechanical sensitivity of the measuring transducer. Mechanical sensitivity, in turn, depends on, besides the length of the measuring tube, also, to a very high degree, the ratio of the inner diameter of the measuring tube to its wall thickness. However, on the other hand, the material of the measuring tube can, in the case of a wall thickness which is too small for the operating pressure, be locally stressed to over its yield strength, a happening which, in turn, would mean a reduction of the ultimate tensile strength of the measuring tube as a whole.

In the dimensioning of measuring transducers of the described kind, a conflict thus results in the respect that, on the one hand, a high strength is to be secured for the measuring tube and, consequently, depending on the selected material, a correspondingly large measuring-tube wall-thickness is to be selected. On the other hand, however, the wall thickness is to be kept as small as possible, because of the required high measurement sensitivity. This has the result that measuring transducers of the described kind have been recommended over the years predominantly for applications with low or mid-range operating pressures up to about 400 bar or below. Measuring transducers for applications with high operating pressures of far above 500 bar, such as are found, for example, in applications with compressed hydrogen or other highly compressed gases, have been able to be recommended commercially, over the years, at best, only in the case of very small nominal diameters of less than 10 mm; these measuring transducers are, additionally, very expensive.

SUMMARY OF THE INVENTION

Considering the above-described disadvantages, an object of the invention is to improve measuring transducers of the described kind in the respect that their respective long term strength can be increased, and this especially also despite higher media pressures, and, indeed, while retaining, at the same time, high sensitivity relative to the primary measured variables, such as mass flow, density and/or viscosity. Beyond this, it is an object of the invention to improve the construction of such measuring transducers in the respect that they can still, despite high pressure and vibration resistance, exhibit as compact installed dimensions as possible. Additionally, the measuring transducer should be as simple and as cost-favorable as possible to manufacture and usable, as much as possible, also for nominal diameter ranges of 10 mm and above.

To achieve these objects, the invention resides in a measuring transducer of vibration-type, especially Coriolis mass flow measuring transducers, for an inline measuring device serving for measuring a medium flowing in a line, such as a pipeline or a tubular line. The measuring transducer includes at least one measuring tube, especially a metal measuring tube, communicating with the line and serving for the conveying of the medium, as well as a support element oscillatably holding the at least one measuring tube.

In a first variant of the invention, it is provided: That the support element includes at least a first passageway and a second passageway, via both of which the at least one measuring tube communicates with the line; and that the at least one measuring tube is affixed, especially releasably, at least a first end, to the support element in the region of the first passageway by means of a first screwed-fitting.

Alternatively to, or in supplementation of, the first variant, in a second variant of the invention, it is provided that the at least one measuring tube, especially its central tube segment, is made, at least in part, of cold-strengthened, or -hardened, or cold-worked, material, for example cold-stretched or autofrettaged material.

Alternatively to the first and second variants, or in supplementation of the first and/or second variants of the invention, in a third variant of the invention it is provided that the measuring transducer includes at least two measuring tubes communicating with the line and serving for conveying the medium. Each of these two tubes is correspondingly oscillatably held on the support element. The two measuring tubes are, in such case, connected to an inlet-side distributor element and to an outlet-side distributor element. At least one of the two distributor elements communicating during operation with the connected pipeline is constructed as an integral component of the support element, so that the support element is, at least in the region of this at least one distributor element, free of materially bonded, joined locations, especially free of solder, braze or weld connections.

In an embodiment of the invention, it is provided that the measuring transducer includes at least one measuring tube, especially a measuring tube curved in U- or V-shape.

In an embodiment of the invention, it is provided that the measuring transducer includes two, essentially equally constructed, measuring tubes, especially measuring tubes extending essentially parallel to one another.

In an embodiment of the invention, it is provided that the support element is constructed in the form of a metal component, especially one which is solid and/or monolithic.

In an embodiment of the first variant of the invention, it is provided that at least the first passageway includes an internal thread for the first screwed-fitting.

In an embodiment of the first variant of the invention, it is provided that the first end of the measuring tube is formed essentially conically and/or tapering toward the outside.

In an embodiment of the first variant of the invention, it is provided that the first end of the measuring tube, especially a first end formed as an inner cone, is received by a sealing seat of the first screwed-fitting. In a further development of this embodiment of the invention, it is additionally provided that the sealing seat of the first screwed-fitting includes a sealing surface, which at least sectionally contacts a first sealing surface of the measuring tube essentially complementary therewith, provided in the region of the first end of the measuring tube. In such case, the first sealing surface of the measuring tube, especially a conically formed first sealing surface of the measuring tube, can be shaped, at least in part, convexly and/or the sealing surface of the sealing seat of the first screwed-fitting, especially a conically constructed sealing surface of the sealing seat of the first screwed-fitting, can be shaped, at least in part, concavely. For this, it can, in a further development of the invention, be of advantage, when the, especially conically formed, sealing surface of the sealing seat of the first screwed-fitting has an included angle, which is different from a complementary included angle of the, especially conically formed, sealing surface of the first end of the measuring tube, especially when the included angle of the sealing surface of the sealing seat is smaller than the included angle of the sealing surface of the first end of the measuring tube. According to another further development of this embodiment of the invention, it is further provided that the sealing seat is provided by a connection element, which is connected, especially again releasably, with the support element in the region of the first passageway. The connection element can, for example, be screwed into the first passageway or also directly formed into the support element in the region of the first passageway, in which case the connection element is an integral part of the support element.

In an embodiment of the first variant of the invention, it is provided that the first screwed-fitting comprises at least one thrust collar, which is affixed, especially screwed-on, to the measuring tube in the region of its end and/or is metal. In a further development of this embodiment of the invention, it is further provided that the measuring tube is affixed, especially releasably, to the sealing seat of the first screwed-fitting by means of a screw sleeve acting against the thrust collar.

In an embodiment of the first variant of the invention, it is provided that the first screwed-fitting is embodied in the form of a cutting ring connection. In a further development of this embodiment of the invention, it is provided that the at least one screwed-fitting includes at least one cutting ring, especially a metal cutting ring, contacting the measuring tube. In another further development of this embodiment of the invention, it is further provided that the measuring tube is affixed, especially releasably affixed, to the sealing seat by means of a screw sleeve acting against the cutting ring.

In an embodiment of the first variant of the invention, it is provided that the first screwed-fitting is embodied as a clamping ring connection. In a further development of this embodiment of the invention, it is provided that the at least one screwed-fitting includes at least one clamping ring, especially a metal clamping ring, contacting the measuring tube. In another further development of this embodiment of the invention, it is further provided that the measuring tube is affixed, especially releasably affixed, to the sealing seat by means of a screw sleeve acting against the clamping ring.

In an embodiment of the first variant of the invention, it is provided that the at least one measuring tube is affixed, especially releasably affixed, to the support element at a second end, especially an outlet-side end, by means of a second screwed-fitting in the region of the second passageway.

In an embodiment of the second variant of the invention, it is provided that the support element is embodied as a metal component, especially a solid and/or monolithic metal component, having passageways formed therein, via which the at least one measuring tube communicates with the line.

In an embodiment of the second variant of the invention, it is provided that the wall of said at least one measuring tube shows an, especially circular, inner zone of plastic deformation and an, especially circular, outer zone of elastic deformation.

In an embodiment of the second variant of the invention, it is provided that at least one of said inner and outer zones extends over the entire length of said measuring tube.

In an embodiment of the second variant of the invention, it is provided that each one of said inner and outer zones extends over the entire length of said measuring tube.

In an embodiment of the second variant of the invention, it is provided that the at least one measuring tube shows a plastic, essentially circularly directed, cold deformation of the inner tube wall, especially to a relative penetration depth of about 20% to 50% of the thickness of the entire wall of said measuring tube.

In an embodiment of the second variant of the invention, it is provided that an inner diameter of the at least one measuring tube and a wall thickness of the at least one measuring tube are selected such that a ratio of said inner diameter to said wall thickness lying in a range between 1.2 and 8.

In an embodiment of the third variant of the invention, it is provided that the support element is a metal component, especially a solid and/or monolithic, metal component, having passageways formed therein for forming the distributor elements, and the at least two measuring tubes are connected to the passageways.

In an embodiment of the third variant of the invention, it is provided that each of the two measuring tubes is connected, especially releasably, with the support element by means of screwed-fittings, especially high-pressure resistant screwed-fittings. In a further development of this embodiment of the invention, at least one of the screwed-fittings is in the form of a screw-, clamping- or cutting-ring-fitting.

In a further development of the invention, the measuring transducer is provided for use in an inline measuring device serving for measuring and/or monitoring at least one parameter of a medium flowing in a pipeline, for example a mass flow, density, viscosity, etc., of the medium. Especially, in such case, it is provided that the measuring transducer, and, as a result, also the inline measuring device formed therewith, is used for measuring a medium, which is flowing in a pipeline and acting on the measuring tube with a pressure of more than 500 bar, especially over 700 bar.

Finally, the invention resides also in a method for manufacturing a measuring transducer of vibration-type, for example a Coriolis mass flow measuring transducer, for an inline measuring device serving for measuring a medium flowing in a line, which measuring transducer includes at least one measuring tube communicating with the line for conveying the medium, as well as a support element oscillatably holding the at least one measuring tube, wherein the method includes a step of autofrettaging the measuring tube.

In an embodiment of the method of the invention, this further includes a step of mounting the measuring tube in the support element. Developing this embodiment further, it is provided that the step of autofrettaging the measuring tube is performed after the mounting of the measuring tube in the support element, or at least only after the mounting of the measuring tube in the support element is finished.

A basic idea of the invention is to achieve the affixing of measuring tubes of a measuring transducer of vibration type in a support element by means of screwed-fittings which are as vibration-resistant as possible. By the use of screwed-fittings, which also are highly pressure resistant, coupled with the use also of sufficiently pressure-resistant measuring tubes, it is possible then to create, in a comparatively simple manner, equally pressure-resistant measuring transducers of the type under discussion. A further basic idea of the invention is to improve the sensitivity of such measuring transducers further by using especially high-strength materials for the respective measuring tube, such as high-strength stainless steel alloys and/or metals additionally strengthened by autofrettage. For this, in turn, the use of screwed-fittings is especially suited, since, in this way, solder, braze or weld connections for the purpose of affixing the respective measuring tube to the support element can be completely avoided. As a result of this, overheating during manufacture of the measuring transducer, with the accompanying loss of strength in the material of the measuring tube, can then, of course, also be avoided. For further simplifying the construction and thus also the manufacture of measuring transducers of the described kind, it is additionally provided that the support element is formed by means of a beam- or block-shaped component, in which, only at the ends, corresponding passageways are provided for the flow-providing connecting of the measuring tube to the pipeline, with the passageways themselves, as well as also possibly required distributor elements, being able to be manufactured very simply, for example, by means of bores terminating within the support element.

An advantage of the measuring transducer of the invention is to be seen in, among other things, the fact that it is, on the one hand, very simply constructed and that, on the other hand, the individual components can be mainly commercially common and, as a result, standardized, components, possibly even components which are permitted or certified for use with high operating pressures.

BRIEF DESCRIPTION OF THE DRAWINGS

The invention, as well as advantageous embodiments, will now be explained in greater detail on the basis of the drawing, the figures of which show as follows:

FIGS. 2a, 3a and 4a first side views of examples of embodiments of measuring transducers of vibration-type suitable for an inline measuring device of FIG. 1;

FIGS. 2b, 3b and 4b second side views of the measuring transducers of FIGS. 2a, 3a and 4a;

DETAILED DESCRIPTION OF EXEMPLARY EMBODIMENTS

Figure 1:
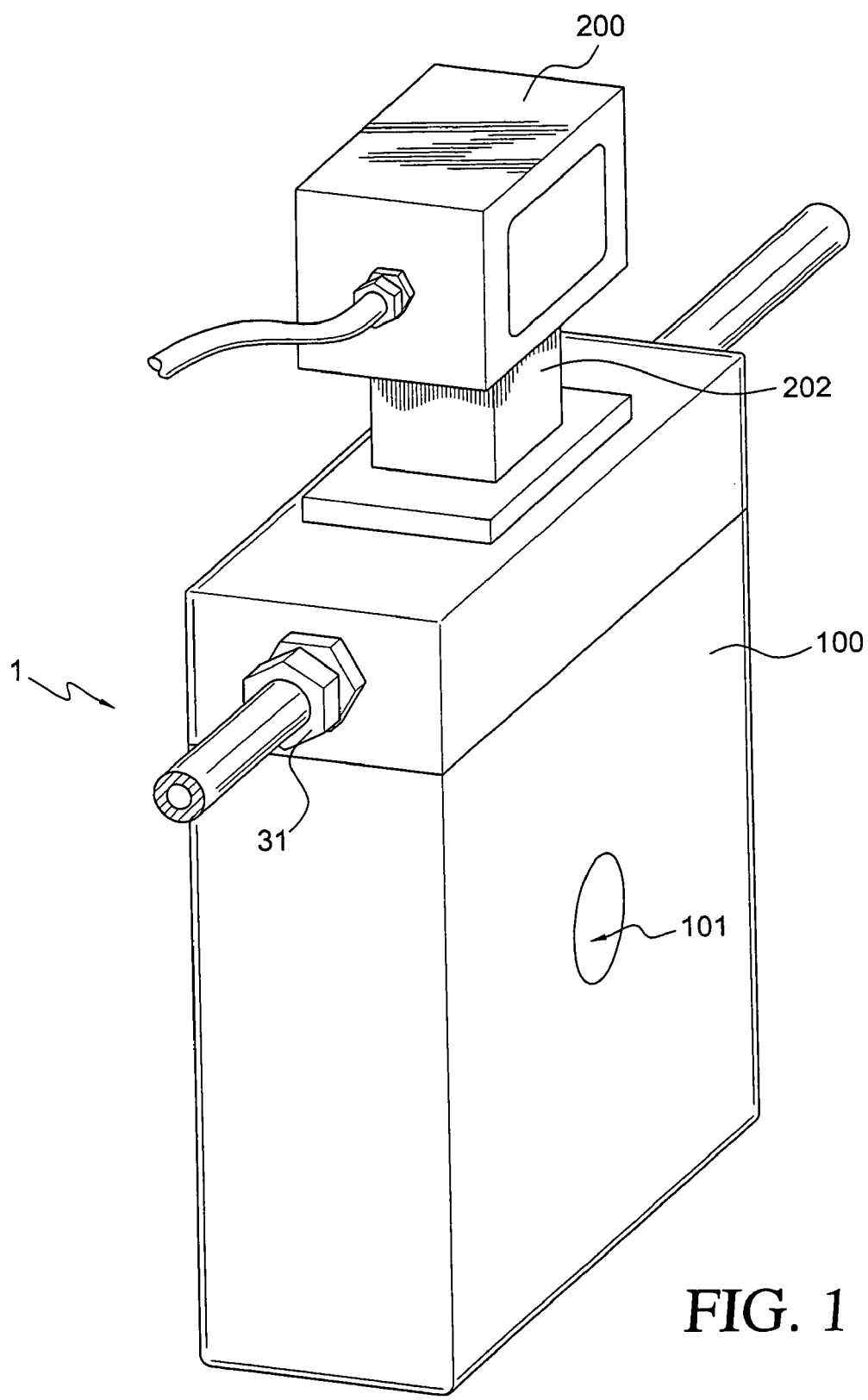
FIG. 1 a perspective view of an inline measuring device for measuring a medium flowing in a connected line.
Figure 5:
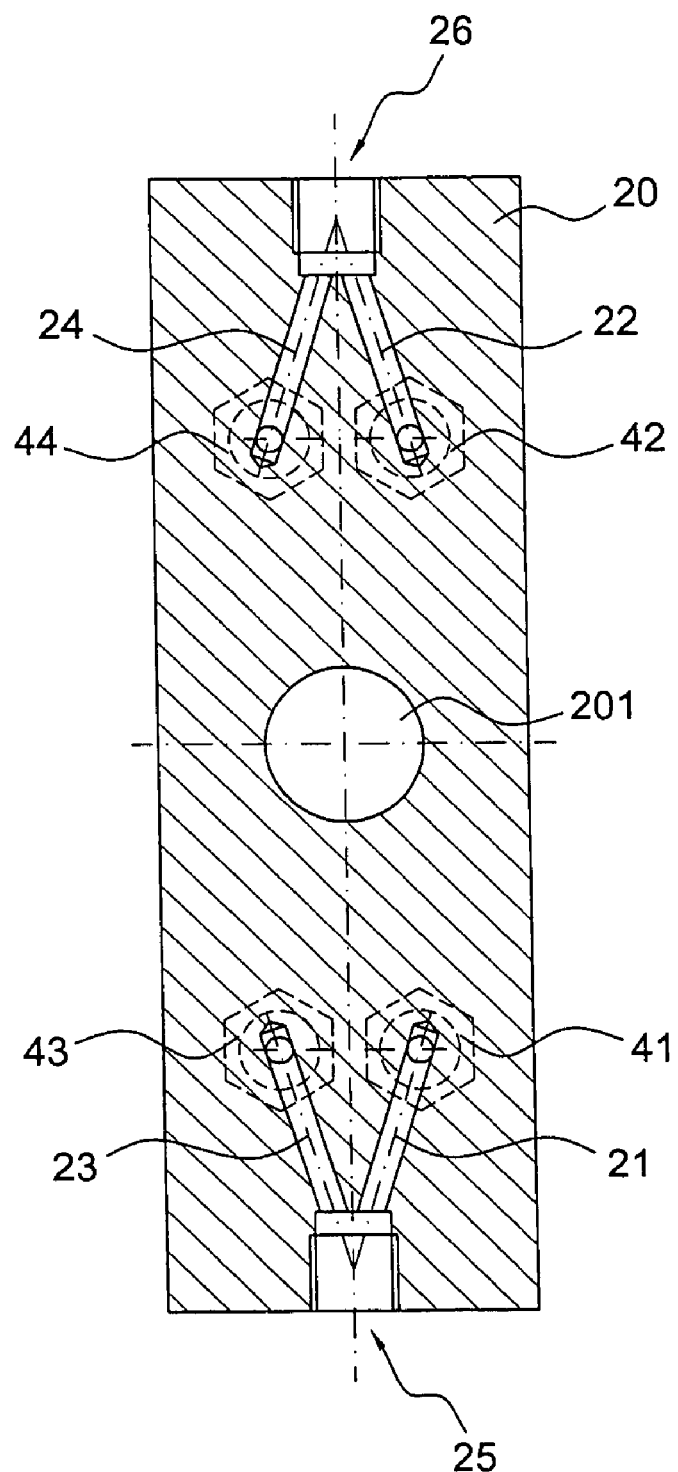
FIG. 5 a sectional view of a support element suitable for the measuring transducers of FIGS. 2a, b, c to 4a, b, c, showing passageways placed therein for the medium to be measured.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

FIG. 1 shows an inline measuring device insertable into a pipeline, for example a process line of an industrial plant. The inline measuring device is constructed, for instance, in the form of a Coriolis mass flow measuring device, density measuring device, viscosity measuring device or the like, serving for the measuring and/or monitoring of at least one parameter, for example a mass flow, density, viscosity, etc., of a medium flowing in a pipeline. The inline measuring device includes therefor a corresponding measuring device electronics (not shown) accommodated in an electronics housing 200, as well as a measuring transducer 1 of vibration type electrically connected therewith. During operation, the medium to be measured flows through the measuring transducer. The measuring transducer 1 serves for producing, in a medium flowing therethrough, mechanical reaction forces, e.g. mass-flow-dependent, Coriolis forces, density-dependent, inertial forces and/or viscosity-dependent, frictional forces. These forces react measurably, especially in a manner registerable by sensor, on the measuring transducer. From these reaction forces, thus by means of correspondingly configured measuring device electronics, e.g. a mass flow m, a density p and/or a viscosity η of the medium can be measured in manner known to those skilled in the art. The measuring transducer is, in use, joined, for such purpose, into the course of a pipeline, through which a medium to be measured, especially a medium held under high pressure of over 500 bar, flows, at least at times, and is thus correspondingly connected to the pipeline before startup. Especially, the measuring transducer, and, as a result, the inline measuring device, is intended for the measurement of media with pressures of 700 bar and above, such as can arise, for example, in applications involving compressed hydrogen.

FIGS. 2a, b, 3a, b, and 4a, b are schematic presentations of more detailed examples of embodiments of the measuring transducer of the invention. Only components essential for the explanation of the invention are shown. Other components possibly required for full functioning of the measuring transducer are possibly omitted, in order to focus better on details of the invention. Thus, the construction, functioning and areas of application of such measuring transducers are known per se to those skilled in the art; as a result, reference is made, for example, to the already mentioned documents illustrating the state of the art.

For conveying the medium to be measured, the measuring transducer 1 includes at least one measuring tube 11, especially a metal measuring tube, communicating with the connected pipeline. During operation, the medium to be measured flows, at least at times, through the measuring tube 11. The at least one measuring tube 11 can, as usual in the case of such measuring transducers, be curved simply, e.g. in U- or V-shape, in a plane; in case required, however, it can be only slightly curved, or it can be essentially straight. Additionally, it is also possible to use a measuring tube wound two or more times, e.g. helix-shaped, for the measuring transducer. In an embodiment of the invention, it is further provided that the at least one measuring tube 11 has an inner diameter DN of at least 2 mm, especially greater than 5 mm. In another embodiment of the invention, it is further provided that the at least one measuring tube has a measuring tube wall thickness s of at most 5 mm, especially less than 3 mm. In a further embodiment, the at least one measuring tube 11 is so constructed that a ratio DN/s of the inner diameter of the measuring tube to its measuring tube wall thickness s amounts to at least 1.2, especially, however, greater than 2. In order, in such case, to be able to assure a sufficiently high pressure resistance of, for example, 700 bar or more, the at least one measuring tube is, in a further embodiment of the invention, made of stainless steel of elevated strength. A suitable material is, for example, a duplex steel, especially UNS S31803 (ASTM A240) or EN 1.4462 (DIN EN 10088-2), a superduplex steel, especially UNS S32750 (ASTM A240), UNS S32760 (ASTM A240), UNS S32520 (ASTM A240), UNS S32550 (ASTM A240, EN 1.4501 (DIN EN 1088-2) or EN 1.4507 (DIN EN 1088-2), or another chromium-nickel-manganese-molybdenum steel, especially UNS S31675 (ASTM F1586), or the like.

The at least one measuring tube 11 is oscillatably held by means of a support element 20, especially a metal support element 20, more rigid in comparison thereto. For this, measuring tube 11 is affixed at least at a first end and at a second end to the support element 20. In an embodiment of the invention, the support element 20 is, in such case, embodied as a solid, especially monolithic, and/or block-shaped component. The support element 20 can be e.g. a profile rod or also a plate of suitable cross section (for example triangular, rectangular, or polygonal, elliptical or circular) and suitable material, for example steel or the like.

In the examples of embodiments illustrated here, the support element 20 is embodied in the form of an essentially beam-shaped prism of rectangular cross section and solid material. In order to provide a support element which is as robust and mechanically stable as possible, its mass is so selected in another embodiment that it is at least ten times greater than the mass of the at least one measuring tube 11. A suitable material for the support element 20 is, for example, black steel or also stainless steel.

For forming a traversing flow path between the at least one measuring tube 11 and the line connected during operation, the support element additionally has at least one inlet-side, first passageway 21 provided therein, as well as an outlet-side, second passageway 22, via which the at least one measuring tube 11 communicates, during operation, with the pipeline sections connected, in each case, to the inlet- and outlet-sides of the measuring tube. For the case illustrated here, in which the support element 20 is made of solid material, the passageways then provided therein, in each case, can be realized in simple manner, by means of terminated bores correspondingly communicating with one another and, as required, extending inclined with respect to one another. For the often desired case, in which the measuring transducer is to be assembled releasably with the pipeline, there is provided on the inlet- and outlet-sides on the support element 20, in each case, a connecting element 31, respectively 32 correspondingly adapted to the actual installation situation. The respective connecting elements can be, for example, flanges, Triclamp®-connectors or also a part of a screwed-fitting, especially a high-pressure-resistant screwed-fitting. In case required, however, also other media-tight, vibration-resistant pipe connectors known to those skilled in the art can be used as connecting elements. The respective connection element 31, 32 itself can be affixed to the support element 20, for example, by welding thereto and/or, as schematically shown in the figures, by being screwed into such.

As additionally evident from the figures taken together, the measuring transducer further includes a measuring-tube housing cap 100, especially one which is likewise metal, for housing the at least one measuring tube 11 media-tightly and affixed to the support element, spaced from the measuring tube. The measuring-tube housing cap 100 can be, for example, welded, soldered, brazed and/or attached by screws to the support element 20. As additionally shown in FIG. 1, the measuring tube housing cap 100 can, as required, be provided with a pressure release opening 101 protecting against possible excess pressure buildup therein. This can be sufficiently tightly sealed by means of a burst disk or by means of an excess pressure valve.

For producing reaction forces corresponding with the physical, measured variable (for example, mass flow, density and/or viscosity of the medium to be measured) and thus descriptive of the medium, for example Coriolis forces correlated with mass flow, inertial forces correlated with density and/or frictional forces correlated with viscosity, the at least one measuring tube is caused, during operation, to vibrate in manner suitable for the measurement. In an embodiment of the invention, it is provided that at least one measuring tube 11 is, during operation, excited, at least in part, to bending oscillations about an imaginary oscillation axis with an oscillation frequency, which is, as much as possible, equal to an instantaneous mechanical eigenfrequency of the measuring tube 11 with the medium conveyed therein. For driving the at least one measuring tube 11, additionally provided is an electromechanical, oscillation exciter 16 acting thereon. Oscillation exciter 16 is appropriately fed by the aforementioned measuring device electronics of the inline measuring device. For the registering of vibrations of the measuring tube and for producing vibration signals corresponding to such, oscillation sensors 17, 18 are applied on and/or in the vicinity of the measuring tube 11 in manner known to those skilled in the art. The sensors are likewise connected in suitable manner with the mentioned measuring device electronics. The oscillation sensors can be various types of sensors described in the state of the art for this purpose, sensors such as e.g. electrodynamic, or optically-working, path, velocity or acceleration sensors. In the examples of embodiments shown here, as is usual in the case of measuring transducers of the described kind serving as Coriolis mass flow transducers, in each case, an inlet-side, first and an outlet-side, second, oscillation sensor 17, 18 is provided for the inlet-, respectively outlet-side, oscillatory movements of the at least one measuring tube. Each of the two oscillation sensors 17, 18 is, in such case, in each case, arranged at about equal spacing between the half-way point and the inlet-, respectively outlet-side end of the measuring tube 11.

As is evident from the combined FIGS. 1, 2*a*, *b* and 5, further provided in the support element 20 is a passageway 201 for connecting lines serving for connecting the oscillation exciter 16 and the oscillation sensors 17, 18 with the measuring device electronics. The passageway 201 can, as required, be appropriately sealed following the laying of the connecting line, for example by means of potting material and/or glass, respectively ceramic. The electronics housing 200 serving for accommodating the measuring device electronics can, as also shown in FIG. 1, be affixed to the support element 20 on the side facing away from the at least one measuring tube, for example via an intermediately placed neck-piece 202, so that the inline measuring device can be constructed as a compact device. The electronics housing can, however, also be formed, for example, in simple manner by means of an electronics housing cap, which is affixed, for example welded or screwed, directly to the support element 20 on its side facing away from the measuring tube.

In the case of the measuring transducers 10 shown here, in each case, a double-tube arrangement is provided, which is formed by means of a first transducer tube 11 serving as first measuring tube and by means of a second transducer tube 12 serving as second measuring tube, especially a second transducer tube of essentially the same structure as, and/or running parallel to, the first transducer tube 11. Each of the two measuring tubes 11, 12, especially ones of identical structure, of the double-tube arrangement is, in each case, flow conductively and oscillatably affixed, in the above-described manner, on the in- and out-let sides, to the support element 20, which, in the examples of embodiments shown here, is embodied as an essentially block- or beam-shaped component of rectangular cross section and solid material. Support element 20 has, for such purpose, a corresponding plurality of passageways 21, 22, 23, 24 formed therein, to which the at least two measuring tubes 11, 12 are, in each case, connected, especially in the same manner.

In order that the medium to be measured can flow, during operation, simultaneously through the two measuring tubes 11, 12, there is provided on the in- and out-let sides in the support element 20, in each case, a flow dividing, or again re-joining, distributor element 25, 26, which, during operation, communicates via the, in each case, associated connecting element 31, respectively 32, on the one hand with the pipeline section connected in each case thereto, as well as, on the other hand, connects into the two measuring tubes 11, 12. In an embodiment of the invention, it is further provided that each of the two distributor elements 25, 26 is formed as an integral component of the support element, and, indeed, in such a manner that the support element 20, at least in the region of these distributor elements 25, 26, is kept free of materially bonded, joined locations, especially, however, free of solder, braze or weld connections. For obtaining these integral distributor elements 25, 26 in the examples of embodiments shown here, a central depression is formed in each end face of the support element 20 (here, solid and beam-shaped), and extending from the floors of the depressions, terminated bores are provided. As evident, for example from a comparison of FIGS. 2*a*, *b* and 5, each of these bores opening to the end faces communicates with an, in each case, associated, terminated bore in the support element 20 opening to the measuring tube side of the support element, thereby forming, in each case, one of the aforementioned passageways 21, 22, 23, 24. The terminated bores opening to the measuring-tube side, on their part, each connect to an associated end of one of the two measuring tubes 11, 12. Alternatively to the use of two measuring tubes, it is possible, as shown, for example in U.S. Pat. No. 5,549,009 or WO-A 02/099363, and it can even be of advantage, to allow medium to flow, during operation, through only one of the two transducer tubes 11, 12, such then functioning as the only measuring tube of the measuring transducer. In such case, the distributor elements can be omitted. The other of the two transducer tubes can then serve, for example, as a counteroscillator canceling the oscillatory forces of the single measuring tube. Additionally, it is also possible, as shown, for example in EP-A 1 207 375 or U.S. Pat. No. 6,851,323, to provide only one transducer tube in the measuring transducer.

For reducing oscillatory movements and/or for targeted adjusting of resonance frequencies of the double-tube arrangement, a further development of the invention provides in the measuring transducer at least a first coupling element 13 mechanically connecting the two transducer tubes 11, 12 on the inlet-side together, as well at least a second coupling element 14 mechanically connecting the two transducer tubes 11, 12 on the outlet-side together.

In a further embodiment of the measuring transducer of the invention, it is provided that the at least one measuring tube 11 is affixed, especially releasably, at at least a first end 11' to the support element 20 in the region of the first passageway 21 by means of a first screwed-fitting 41.

FIGS. 2*a*, 3*a* and 4*a* show, partially in section and schematically, illustrative variants of such a screwed-fitting.

In the examples of embodiments shown here, in each case, a screw sleeve 413 bearing a threaded extension 413' interacts with a thrust collar 414, especially a metal thrust collar of the screwed-fitting 41, held on a measuring tube end by force- and/or shape-interlocking. In such case, the respective first end 11' of the measuring tube 11 is so pressed against a circumferential sealing surface 416' of a sealing seat 416 by means of thrust collar 414 and the screw sleeve 413 acting thereon, that the sealing surface 416' tightly contacts a sealing surface of the measuring tube 11 essentially complementary thereto, provided and/or formed during assembly in the region of the first end 11'. Sealing surface 416' is sufficiently large for the desired sealing action.

The screw sleeve 413 in the screwed-fittings 41 of the invention can be a threaded union nut of hexagonal or other type drivable by a wrench. The thrust collar 414, in turn, can be embodied, for example, as a one- or possibly multi-piece, cutting, clamping and/or wedge ring, which is pressed, in each case, by means of the screw sleeve, against the respective end 11' of the measuring tube 11 and, as a result, is caused to become attached thereto. In other words, the screwed-fitting 41 can be realized as a cutting ring connection, wedge-ring connection or clamping-ring connection. Further, it is also possible to let the thrust collar 414 act against a bulge provided on the measuring tube end 11' and at least partially forming the sealing surface 416'. The bulge can be produced e.g. following sliding of the thrust collar 414 onto the end of the measuring tube end 11' by appropriate upsetting of the measuring tube end 11'.

In the variants shown in FIGS. 2a and 4a, the thrust collar 414 of the screwed-fitting 41 is provided in the form of a threaded ring screwed onto the respective end 11' of the measuring tube 11. For producing the connection between the measuring tube 11 and the support element 20 in this variant, first the thrust collar 414, which has an internal screw thread 414' in at least one area, is screwed onto the end of the measuring tube 11' equipped with a matching outer thread provided for such purpose. For improving the strength of this screwed-fitting, the thrust collar 414 can, following being screwed onto the measuring tube 11, additionally be compressed onto such, so that, in addition to the shape-interlocking formed by means of the screw thread, also a frictional interlocking is achieved. Alternatively or in supplementation thereof, the portion 414" of the thrust collar distal with respect to the end 11' of the measuring tube can also be provided with longitudinal slots and/or a conical tightening surface, which, in turn, interacts with a complementary surface of the screw sleeve 413 embodied here in the form of a threaded union nut.

Then, in screwing the screw sleeve 413 into an internal thread 416" arranged in the sealing seat 416 concentrically to the measuring tube 11, the screw sleeve 413 exerts a force on the tightening surface 414" of the thrust collar 414. Concurrently therewith, an axial force component of the force exerted by screw sleeve 413 as it is screwed in, presses the thrust collar 414 and, consequently also the measuring tube 11, at its sealing surface, tightly against the sealing surface 416' of the sealing seat 416. By radial components of the force exerted by the screw sleeve 413 as it is screwed in, additionally the slotted portion 414" of the thrust collar 414 (here thus partially embodied also as a clamping ring) is pressed against the surface of the end 11" of the measuring tube, so that thrust collar 414 and measuring tube 11 are lastly additionally clamped together at this location. An advantage of the screwed-fitting 41 manufactured in this way is that it can not only be designed to have high pressure resistance, but it also is self-locking and thus especially vibration resistant. By using a one-piece thrust collar 414, which is wedged at a plurality of locations inside the connection, it is prevented that separate pieces can be mutually loosened by vibratory action, such as can occasionally happen in the case of multi-part cutting- and/or clamping-rings. As a result, it can be of advantage, especially for the case in which the measuring transducer is provided for applications with very high operating pressures, to use, instead of screwed-fittings with multi-part thrust collars, those using a one-piece thrust collar.

For achieving as great a sealing action as possible and thus also for providing a tube connection which is as resistant as possible to high pressure, it can also be of advantage to form the first end of the measuring tube essentially conically and/or tapering outwards. In the case of the variant shown in FIG. 2a, therefore, the first end 11' of the measuring tube 11 is embodied as an inner cone and the sealing seat 416 correspondingly as an outer cone complementary thereto. Accordingly, the here conically formed, first sealing surface of the measuring tube 11 is, at least in part, convexly formed, while the likewise conically formed sealing surface 416' of the sealing seat 416 of the first screwed-fitting is formed, at least in part, concavely. In a further embodiment of the invention, it is provided that the sealing surface 416' of the sealing seat 416 of the first screwed fitting is so formed conically that it has an included angle, which is different from a complementary included angle of the possibly likewise conically formed sealing surface of the first end 11' of the measuring tube 11. Especially for the aforementioned case in which both the sealing surface of the measuring tube 11 as well as also the sealing surface 416' of the sealing seat 416 are conically formed, a further embodiment of the invention provides that an included angle of the sealing surface 416' of the sealing seat 416 is smaller than an included angle of the sealing surface of the first end 11' of the measuring tube 11. Instead of the inner, respectively outer cones shown in FIGS. 2a and 4a possibly differing slightly from one another, it is also possible to provide other sealing surfaces, for example spherical, or, as shown for example in FIG. 3a, also cylindrical surfaces, on the measuring tube end 11' and/or in the sealing seat 416; these can also, as required, differ significantly from one another as regards their basic shapes. For example, even a blunt measuring tube end can be set in a conical sealing seat and still be tight to the medium, especially also tight to pressure.

The sealing seat 416 in the variant of the invention shown in FIG. 2a is provided by a connection element 41' of the screwed-fitting. Connection element 41' is connected, especially releasably, with the support element 20 in the region of the at least one, first passageway 21. In the example of an embodiment shown here, the connecting element 415 includes a connecting projection having an external thread 415', by means of which it is screwed into the passageway 21 equipped with a corresponding internal thread 21'. Especially for the case in which the thrust collar 414 is embodied as a clamping, cutting or wedge ring, it can be of advantage, when the connecting element 415 has, as shown in FIG. 3a, a screw extension with an outer thread 415" matching the inner thread 413" on the screw sleeve 413. In this variant, thus, screw sleeve 413 is screwed into the threaded extension, in order to produce, on the one hand, the required pressing force between thrust collar 414 and measuring tube 11 required for the affixing of the measuring tube in the sealing seat 416 and, on the other hand the required pressing force between the thrust ring 414 and the connecting element 415. The employed screwed-fittings can, in such case, also be of such kind as disclosed in U.S. Pat. Nos. 6,766,582, 502,323, 6,640,457, 4,586,731, GB-A 14 73 984. An advantage of these two above-mentioned variants is also to be seen, among other things, in the fact that the at least one screwed-fitting 41 can be implemented practically completely by means of conventional, especially also standardized, screwed-fittings, such as e.g. Swagelok® of the firm Swagelok Co., Solon, Ohio, US, Nova Swiss® type of the firm Nova Werke AG, Effretikon, CH, EO2-form of the firm Parker Hannifin Corp. or the like. Especially, it is possible, in such case, to have recourse, in advantageous manner, also to established screwed-fittings, such as have proven themselves in applications with strong vibrations as well as also high operating pressures.

In contrast to the variants shown in FIGS. 2a and 3a, in the case of the variant shown in FIG. 4a, the sealing seat 416 is formed directly in the support element 20 and, as a result, is embodied as an integral part thereof. In advantageous manner, it is, however, also possible in such case, to base the sealing seat 416 in certain areas, especially in the region of the sealing surface 416', on the corresponding connecting elements of established, vibration-resistant, especially also high pressure resistant, screwed-fittings, especially those with screw ring or screw-/clamping-ring.

Although the affixing of the at least one measuring tube has been explained on the basis of a screwed-fitting 41, it is quite evident that the measuring tube can, in advantageous manner, also be affixed to the support means 20 again at its second end 11" by means of a corresponding screwed-fitting. By way of example, in this way, also a defective screwed-fitting and/or a defective measuring tube can, as required, be replaced by intact components. In a further development of the invention, it is additionally provided that the at least one measuring tube 11 is affixed to the support means 20 at its first end 11' by means of a first screwed-fitting 41, especially one which is also high pressure resistant, and equally also at its second end 12 by means of a second screwed-fitting 42, especially one which is essentially of equal construction to the first screwed-fitting. For the above-described case, in which the measuring transducer includes at least two measuring tubes 11, 12, another further development of the invention provides that each of the two measuring tubes 11, 12 is affixed to the support means 20, both on the inlet-side and on the outlet-side, in each case by means of a screwed-fitting 41, 42, 43 or 44, especially a high pressure resistant screwed-fitting.

It is to be noted here that, as evident, for example, from the combination of FIGS. 2a and 2b, all of the screwed fittings 41, 42 serving for the affixing of the at least one measuring tube 11 to the support means 20 are, especially also in contrast to the above-mentioned connecting elements 31, 32, arranged within the measuring-tube housing-cap 100 and are thus, as a result, also arranged within the measuring transducer.

Figure 6:
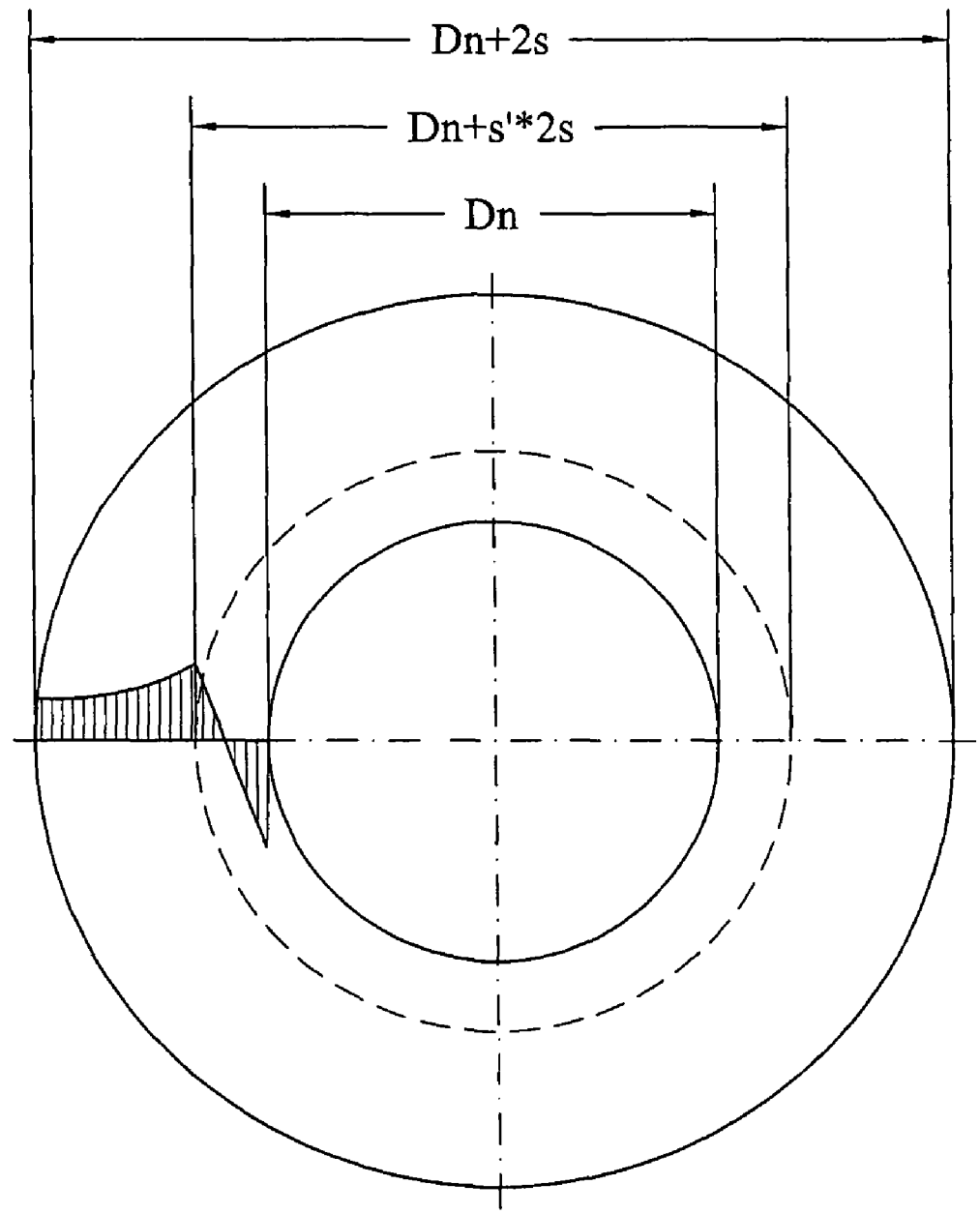
FIG. 6 schematically, a cross section of a measuring tube suited for a measuring transducer as shown in FIGS. 2a, b, c to 4a, b, c with a diagram provided therein showing tangential stress in the measuring tube as a function of radius.
Figure 7:
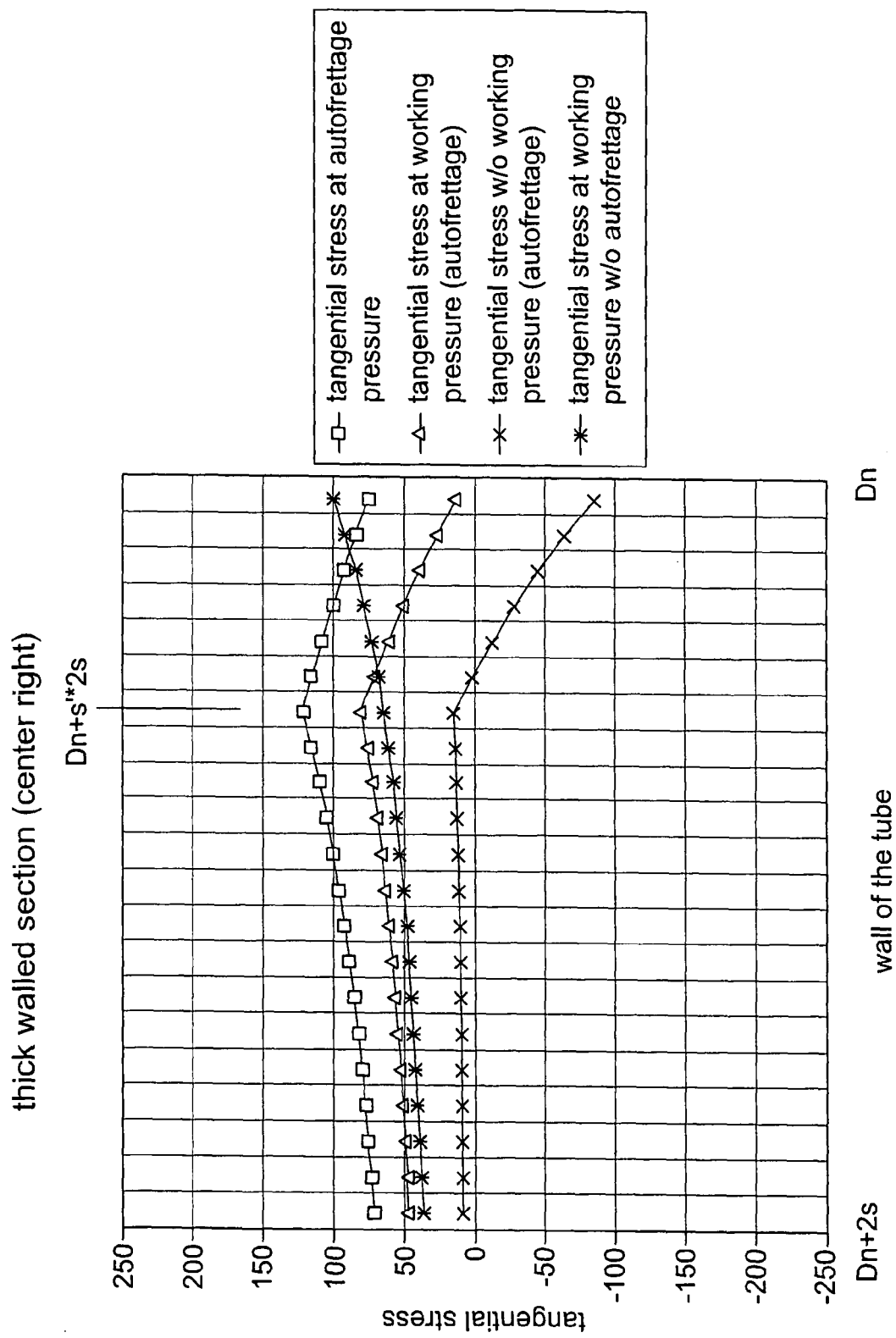
FIG. 7 examples of tangential stress as a function of radius for measuring tubes of vibration-type measuring transducers at different points in time, especially in the case also of different operating conditions.

The strength, especially also the pressure-resistance, and, as a result, also the operational safety of the measuring transducer, can, coupled with assurance of a still high sensitivity to the physical variable to be measured for the medium, be yet further increased by fabricating the at least one measuring tube, at least, however, the central tube segment which directly corresponds with the oscillation sensors and the oscillation exciter and which is caused to oscillate during operation, from an at least partly cold-strengthened, or cold-worked, material, especially a material which has been cold-stretched or autofrettaged. By autofrettage, it is possible, as shown schematically in FIG. 6, to produce a plastic, essentially circularly directed, cold deformation of the inner wall of the measuring tube, for example, to a relative penetration s' depth of about 20% to 50% of the measuring tube wall thickness s (s'=0.2s...0.5s), so that the measuring tube has, at least in the operating-pressure-free state, a circular, inner Zone I of plastic deformation and a circular, outer Zone II of elastic deformation. At least one or each one of said inner and outer zones may extend over the entire tube length. Autofrettage can be implemented, for example, also using the already mentioned materials for the measuring tube, such as, for example, duplex steel, superduplex steel or other chrome-nickel-manganese-molybdenum steels. As a result of the radial and tangential residual stress left in the measuring tube wall by the cold strengthening achieved by the partly plastic deformation of the measuring tube inner wall, the measuring tube 11 can be designed to be operationally stronger and thus more pressure resistant compared to its initial state; compare FIG. 7, especially also in comparison with FIG. 6. By strengthening the at least one measuring tube 11, it can be embodied such that it is more resistant to a considerable degree, especially as regards pressure-resistance as well as regards fatigue strength, as compared to untreated measuring tubes of the same dimensions.

Measuring tubes which have proven themselves as suited for the autofrettage, especially also with regard to a sufficiently high measuring accuracy of the measuring transducer with, at the same time, high pressure resistance, have, initially, a ratio DN/s (inner diameter DN of the measuring tube to its measuring tube wall thickness s) lying in a range between 1.2 and 8. This holds, especially, also for operating pressures of more than 500 bar, especially also over 700 bar. In a further embodiment of the invention, the at least one autofrettaged measuring tube 11 is additionally so embodied as regards its dimensions, especially nominal diameter DN, wall thickness s and relative penetration depth s', that it fulfills the following dimensioning formula:

$$1.83 < \left\{ \begin{array}{c} 1 - \left(\dfrac{1 + \frac{2s \cdot s'}{DN}}{1 + \frac{2s}{DN}}\right)^2 + 2\ln\left(1 + \dfrac{2s \cdot s'}{DN}\right) + \\ \left[\sqrt{3} - 1 - \left(\dfrac{1 + \frac{2s \cdot s'}{DN}}{1 + \frac{2s}{DN}}\right)^2\right] \cdot \\ \dfrac{\left(1 + \frac{2s}{DN}\right)^2 - 1}{\left(\dfrac{1 + \frac{2s}{DN}}{1 + \frac{2s \cdot s'}{DN}}\right)^2 + 1} \end{array} \right\} \cdot \dfrac{\left(1 + \frac{2s}{DN}\right)^2 + 1}{\left(1 + \frac{2s \cdot s'}{DN}\right)^2 - 1} < 2.8$$

In using a measuring tube dimensioned in the above-described manner, for example, the pressure resistance of the measuring transducer can be increased, in comparison to a conventional measuring transducer with otherwise equal dimensions and materials, by from 5% to about 60%.

The aforementioned dimensioning formula for the autofrettaged measuring tube can, in the ascertaining of the optimum ratio DN/s, for easier handling, be modified, as required, in the following manner:

$$1.83 < a \cdot \left(\dfrac{s}{DN}\right)^3 + b \cdot \left(\dfrac{s}{DN}\right)^2 + c \cdot \left(\dfrac{s}{DN}\right) + d < 2.8$$

with the coefficients a, b, c and d are provided in the following table (the commas in the table represent decimal points) as a function of the actually selected, relative penetration depth s':

| s' | a | b | c | D |
|---|---|---|---|---|
| 0.2 | −0.0604 | 0.3032 | 0.7824 | 1.6994 |
| 0.3 | −0.0706 | 0.4284 | 0.9942 | 1.7045 |

-continued

| s' | a | b | c | D |
|---|---|---|---|---|
| 0.4 | −0.072 | 0.5185 | 1.1018 | 1.7013 |
| 0.5 | −0.0691 | 0.5604 | 1.1168 | 1.6994 |

The deformation forces required for implementing the autofrettage can be produced, for example, by introducing a suitable fluid, especially a liquid, such as oil or water or a liquid-gas mixture, into the lumen of the already built measuring tube and by providing this introduced fluid with a sufficiently high pressure, especially at about 1.5 to 3 times the nomiminal operating pressure. Thus, the measuring tube can also be autofrettaged, in advantageous manner, in-situ, thus in installed form and location. Alternatively or in supplementation of an in-situ autofrettaging of the measuring tube, it can, at least partly, also have been correspondingly pre-cold-strengthened, especially also autofrettaged.

For the above-described case in which the at least one measuring tube is provided on its two ends, in each case, with an external screw-thread, it can be of advantage, at least in the case of cold-worked material, especially autofrettaged material, to roll the outer thread for both thrust collars 414 into the measuring tube wall.

For preventing thermal overloadings of the measuring tube strengthened by cold-working, a further embodiment of the invention additionally provides that the components of the above-mentioned, at least one oscillation exciter 16 and/or the respectively used, oscillation sensors 17, 18 are connected, especially releasably, with the at least one, especially autofrettaged, measuring tube 11 solely by force- and/or shape-interlocking, and, indeed, without connection involving bonding of material at elevated working temperatures, such as in the case of solder, braze or weld connections. For the above-described case, in which the measuring transducer is formed by means of a double-tube arrangement and in which the two transducer tubes are additionally mechanically coupled together on the in- and out-let sides by means of at least two coupling elements 13, 14, another embodiment of the invention further provides that the at least two coupling elements are connected, especially releasably, with the two transducer tubes 11, 12 solely by means of force- and/or shape-interlocking.

Force- and/or shape-interlocked connections can be produced e.g. by compressing or clamping the components onto the measuring tube. Methods suited for accomplishing this are described in the initially mentioned U.S. Pat. No. 6,047, 457 or in U.S. patent application Ser. No. 11/242,803 of the assignee. Beyond this, also conventional pipe clamps, especially largely vibration-resistant ones, can be used for the affixing of oscillation exciter and/or oscillation sensors. For minimizing possible microrubbing in the region of such components clamped on the at least one vibrating measuring tube, their surfaces contacting the measuring tube 11 can, for example, be polished and/or slightly bulged out. Equally, additionally the corresponding, contacted surfaces of the at least one measuring tube 11 can be, at least, polished.

An advantage of the measuring transducer of the invention is to be seen in the fact that it, especially also the at least one measuring tube, can, on the one hand, resist high operating media-pressures of 700 bar or above, and, on the other hand, measuring tubes of comparatively small wall thickness can be used. Consequently, the measuring transducer of the invention, and, thus, also the inline measuring device, is suited especially also for applications involving compressed hydrogen, especially compressed hydrogen serving for charging into tanks of motor vehicles.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A method for manufacturing a measuring transducer, said measuring transducer including:
   at least one measuring tube for conveying a medium to be measured, and
   a support element serving for oscillatable holding of said at least one measuring tube, said method comprising:
   mounting the measuring tube in the support element such that said support element holds said at least one measuring tube in an oscillatable manner,
   applying oscillation sensors on and/or in the vicinity of said measuring tube for producing vibration signals, and
   autofrettaging the measuring tube.

2. The method as claimed in claim 1, further comprising:
   connecting said oscillation sensors with a measuring device electronics.

3. The method as claimed in claim 2, wherein:
   autofrettaging the measuring tube is performed after mounting of the measuring tube in the support element.

4. The method as claimed in claim 1, further comprising:
   placing in said support element at least first and second passageways for communicating said at least one measuring tube with a line.

5. The method as claimed in claim 4, further comprising:
   connecting said oscillation sensors with measuring device electronics, said measuring device electronics being adapted to measure at least one of: mass flow, density, and viscosity of the medium.

6. The method as claimed in claim 4, further comprising using a first screwed-fitting to affix said at least one measuring tube with a first end to said support element at said first passageway.

7. The method as claimed in claim 6, further comprising using a second screwed-fitting to affix said at least one measuring tube with a second end to said support element at said second passageway.

8. The method as claimed in claim 1, further comprising:
   providing an electromechanical oscillation exciter for driving said at least one measuring tube.

9. A method for manufacturing a measuring transducer, said measuring transducer including:
   at least one measuring tube for conveying a medium to be measured; and
   a support element serving for oscillatable holding of said at least one measuring tube, said method comprising the steps of:
   autofrettaging the measuring ntube;
   using a first screwed-fitting to affix said at least one measuring tube with a first end to a support element at said first passageway; wherein:
   autofretting the measuring tube is performec after affixing said at least one measuring tube with the first end to said support element at said first passageway.

10. The method as claimed in claim 9, wherein:
    autofrettaging the measuring tube is performed after affixing said at least one measuring tube with the second end to said support element at said second passageway.

* * * * *